(12) United States Patent
Zhou et al.

(10) Patent No.: US 10,176,909 B2
(45) Date of Patent: Jan. 8, 2019

(54) ELECTRONIC COMPONENT MODULE WITH LEADS AND METHOD FOR MANUFACTURING THE SAME

(71) Applicant: Murata Manufacturing Co., Ltd., Nagaokakyo-shi, Kyoto-fu (JP)

(72) Inventors: Jie Zhou, Jiangsu (CN); Yoshimitsu Hamuro, Jiangsu (CN); Shuji Tsubaki, Jiangsu (CN)

(73) Assignee: MURATA MANUFACTURING CO., LTD., Kyoto (JP)

(\*) Notice: Subject to any disclaimer, the term of this patent is extended or adjusted under 35 U.S.C. 154(b) by 0 days.

(21) Appl. No.: 15/884,846

(22) Filed: Jan. 31, 2018

(65) Prior Publication Data
US 2018/0158581 A1 Jun. 7, 2018

Related U.S. Application Data

(63) Continuation of application No. PCT/CN2016/090694, filed on Jul. 20, 2016.

(30) Foreign Application Priority Data

Sep. 25, 2015 (CN) .......................... 2015 1 0621595

(51) Int. Cl.
*H01C 17/28* (2006.01)
*G01K 7/22* (2006.01)
(Continued)

(52) U.S. Cl.
CPC ............. *H01C 17/28* (2013.01); *G01K 7/223* (2013.01); *H01C 1/144* (2013.01); *H01C 7/18* (2013.01);
(Continued)

(58) Field of Classification Search
CPC .......... H01C 17/28; H01C 1/144; H01C 7/18; G01K 7/22; G01K 7/223
See application file for complete search history.

(56) References Cited

U.S. PATENT DOCUMENTS 3,147,457 A * 9/1964 Gill .......................... G01K 1/16
136/233
3,205,465 A * 9/1965 Lambertson ............ B22C 15/00
252/504

(Continued)

FOREIGN PATENT DOCUMENTS

| CN | 101583858 A | 11/2009 |
|---|---|---|
| CN | 101677151 A | 3/2010 |

(Continued)

OTHER PUBLICATIONS

Official Communication issued in International Patent Application No. PCT/CN2016/090694, dated Oct. 24, 2016.

*Primary Examiner* — Kyung Lee
(74) *Attorney, Agent, or Firm* — Keating & Bennett, LLP

(57) ABSTRACT

An electronic component module with leads includes an electronic component including terminal electrodes at both ends of the electronic component body, and first and second leads including metal wires covered with insulating members and arranged side-by-side, the first and second leads are electrically connected to the terminal electrodes, wherein exposed metal wire portions where the metal wires are exposed respectively from the first and second leads are provided on joint surfaces of the first and second leads on a same side and used to join to the terminal electrodes, the exposed metal wire portion of the first lead and the exposed metal wire portion of the second lead are spaced apart from each other by a predetermined interval in a lead length (Continued)

direction, the terminal electrodes are electrically connected to the metal wire exposed portions of the first and second leads, respectively, by solder.

22 Claims, 16 Drawing Sheets

(51) Int. Cl.
*H01C 1/144* (2006.01)
*H01C 7/18* (2006.01)
*H01G 2/06* (2006.01)
*H01G 4/228* (2006.01)
*G01K 7/16* (2006.01)
*H01C 7/00* (2006.01)

(52) U.S. Cl.
CPC ............ H01G 2/065 (2013.01); H01G 4/228 (2013.01); *G01K 2007/163* (2013.01); *H01C 7/008* (2013.01)

(56) References Cited

U.S. PATENT DOCUMENTS

| 5,379,022 | A | * | 1/1995 | Bacon | H01C 1/16 |
| | | | | | 338/20 |
| 5,462,359 | A | * | 10/1995 | Reichl | G01K 13/02 |
| | | | | | 338/22 R |
| 6,588,931 | B2 | * | 7/2003 | Betzner | G01K 7/22 |
| | | | | | 338/22 R |
| 7,075,407 | B1 | * | 7/2006 | Kawamoto | G01K 1/14 |
| | | | | | 338/22 R |
| 2009/0316752 | A1 | | 12/2009 | Kawase et al. | |
| 2010/0066482 | A1 | * | 3/2010 | Shiko | G01K 7/223 |
| | | | | | 338/22 R |

FOREIGN PATENT DOCUMENTS

| CN | 202041316 U | 11/2011 |
| JP | 11-108771 A | 4/1999 |
| JP | 2000-138105 A | 5/2000 |

* cited by examiner

FIG. 6A
FIG. 6B
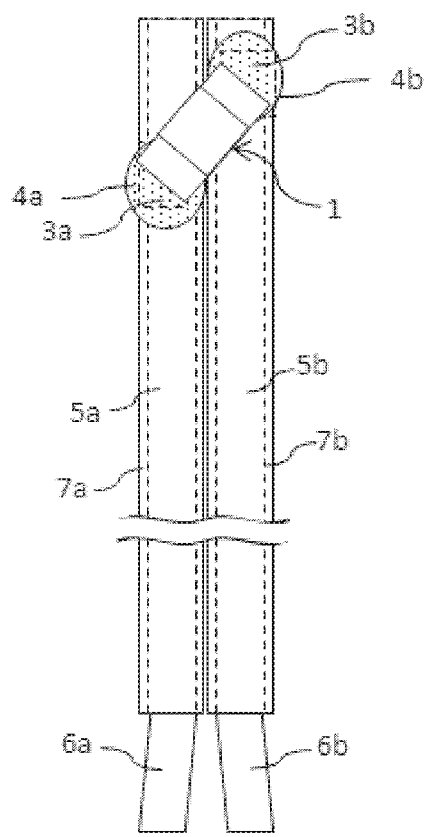
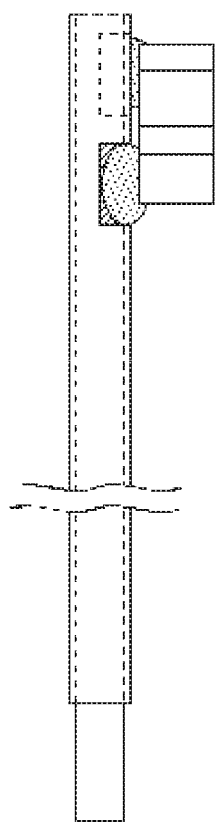
FIG. 6C
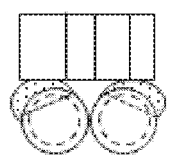

FIG. 10A
FIG. 10B
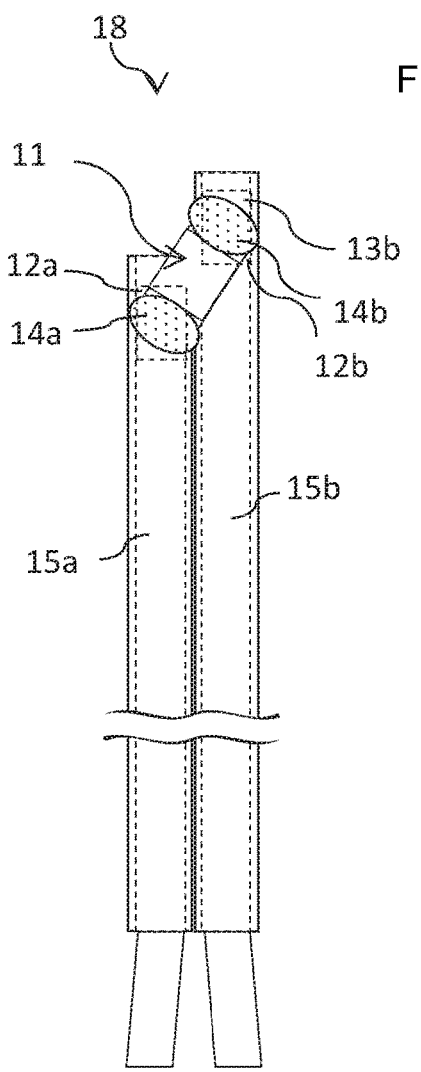
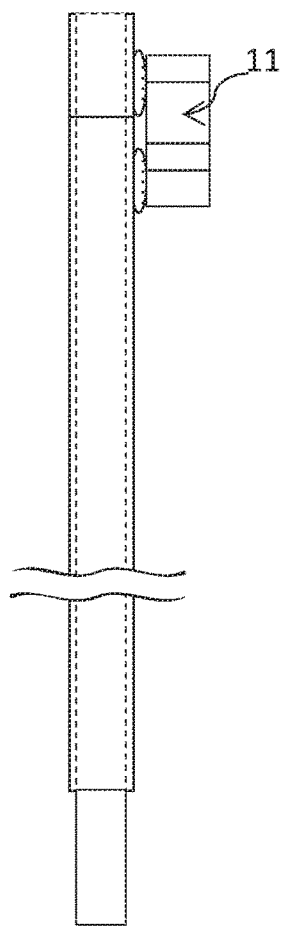
FIG. 10C
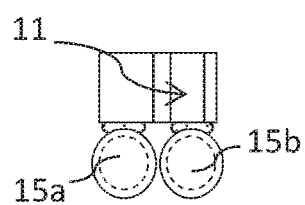

FIG. 12A
FIG. 12B
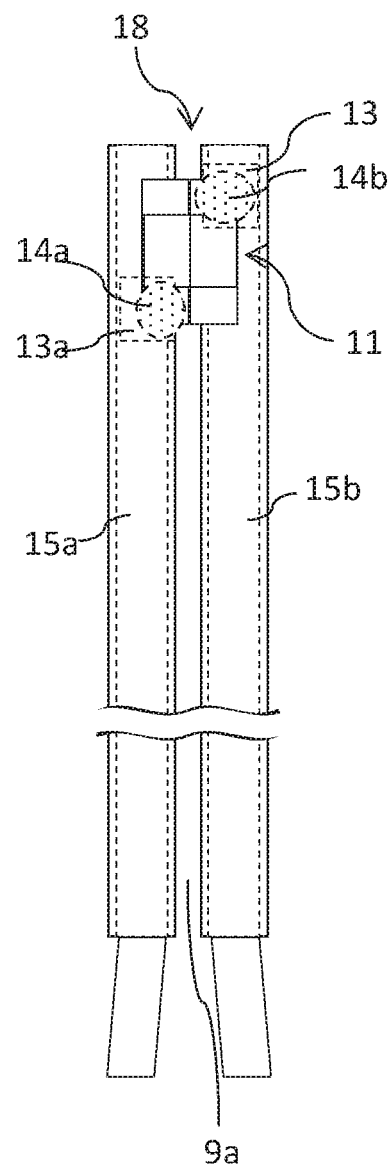
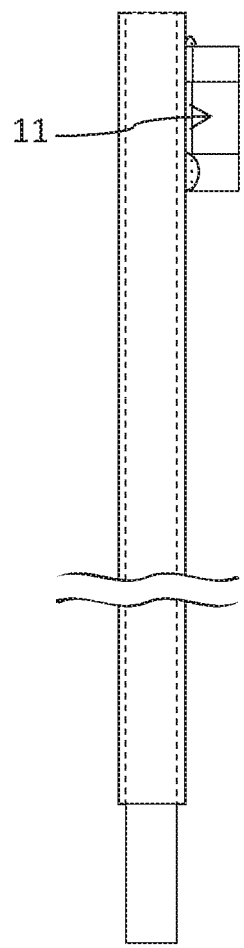
FIG. 12C
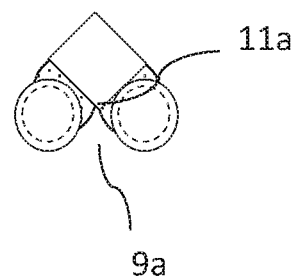

FIG. 13A
FIG. 13B
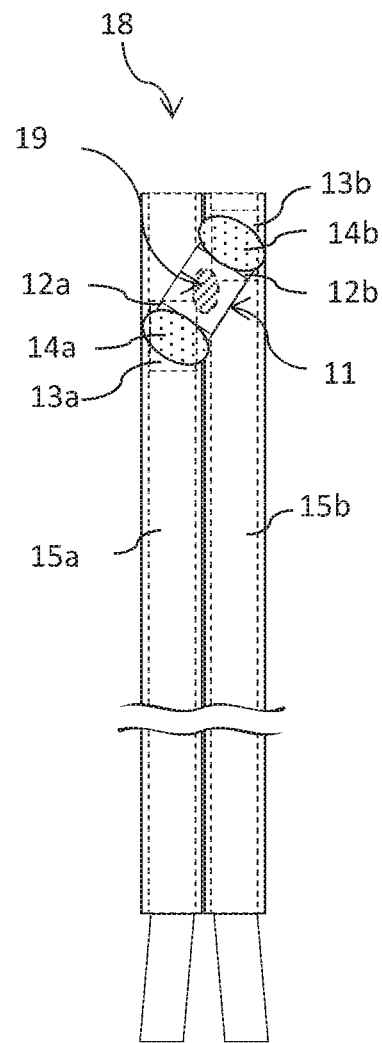
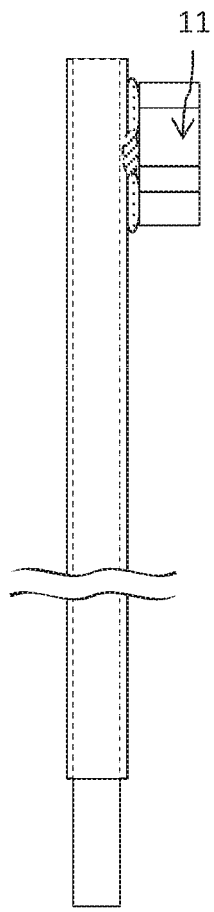
FIG. 13C
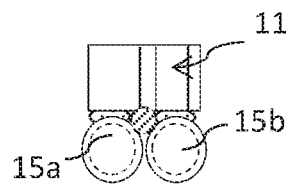

ELECTRONIC COMPONENT MODULE WITH LEADS AND METHOD FOR MANUFACTURING THE SAME

CROSS REFERENCE TO RELATED APPLICATIONS

This application claims the benefit of priority to Chinese Patent Application No. 201510621595.7 filed on Sep. 25, 2015 and is a Continuation Application of PCT Application No. PCT/CN2016/090694 filed on Jul. 20, 2016. The entire contents of each application are hereby incorporated herein by reference.

BACKGROUND OF THE INVENTION

1. Field of the Invention

The present invention relates to an electronic component module with leads and a method for manufacturing the same.

2. Description of the Related Art

In the prior art, in an electronic component module with leads, for example, a thermistor module as a temperature sensor, a thermistor including terminal electrodes at both ends thereof is mounted on two parallel leads, a coated insulator of the same front end of the two leads is peeled off to expose metal wires, the exposed metal wires are connected to the terminal electrodes of the thermistor by soldering, respectively.

As an example, China Patent Publication No. 101583858 proposes a thermistor module with leads which has the following structure. As shown in FIG. 8, first and second leads 49*a* and 49*b* are formed by covering metal wires 42*a* and 42*b* with insulating members 43*a* and 43*b*, and the lengths thereof are different from each other and arranged side by side. The front ends of the first and second leads 49*a* and 49*b* are cut into an oblique shape so that the surfaces of inner wires 42*a* and 42*b* are exposed, two terminal electrodes 411 and 412 located at both ends of a thermistor 41 are electrically connected to the corresponding exposed metal wires 42*a* and 42*b* through solder 40*a* and 40*b*, which ensures that the front ends of at least one of the leads is cut off to form a specific angle with the side turn portion of the connected terminal electrode.

In China Patent Publication No. 101583858, the two leads can be arranged in parallel without gaps, and a short-circuit failure is not easily generated. However, since the metal wires are connected to the thermistor while being cut into an oblique shape, the area of a solder joint portion is small and the joint strength is low. Furthermore, when the diameter of the leads is relatively small, the area of the solder joint portion is reduced accordingly, and the joint strength is further lowered, especially in thermal shock, circuit breakage is likely to occur due to the break of the solder joint portion. Besides, when cutting the front ends of the two leads at a specific angle, the smaller the lead diameter, the higher the accuracy of the cutting process required, so that it is difficult to realize the installation of the thermistor on leads with smaller diameter.

SUMMARY OF THE INVENTION

Preferred embodiments of the present invention provide electronic component modules with leads capable of preventing short-circuit failure while ensuring a joint strength, and provide methods of manufacturing the same.

An electronic component module with leads according to a preferred embodiment of the present invention includes an electronic component including terminal electrodes at both ends of the electronic component body, and first and second leads including metal wires covered with insulating members and arranged side-by-side, the first and second leads being electrically connected to the terminal electrodes, wherein metal wire exposed portions where the metal wires are exposed respectively from the first and second leads are provided on joint surfaces of the first and second leads on a same side used to join to the terminal electrodes, the metal wire exposed portion of the first lead and the metal wire exposed portion of the second lead are spaced apart from each other by a predetermined interval in a lead length direction, the terminal electrodes are electrically connected to the metal wire exposed portions of the first and second leads, respectively, by solder.

In an electronic component module with leads according to a preferred embodiment of the present invention, it is preferable that the electronic component is provided with a predetermined angle between the longitudinal direction and the lead length direction.

In an electronic component module with leads according to a preferred embodiment of the present invention, it is preferable that the longitudinal direction is parallel or substantially parallel to the lead length direction.

In an electronic component module with leads according to a preferred embodiment of the present invention, it is preferable that an area of the metal wire exposed portion of the first and second leads is equal to or greater than the joint area of the terminal electrodes and the corresponding metal wire exposed portions, respectively.

In an electronic component module with leads according to a preferred embodiment of the present invention, it is preferable that the metal wire exposed portions of the first and second leads respectively extend to the outer peripheral side of the corresponding lead, toward non-adjacent outer directions of the first and second leads.

In an electronic component module with leads according to a preferred embodiment of the present invention, it is preferable that an end surface of the first lead to mount one end of the electronic component and an end surface of the second lead to mount one end of the electronic component are not aligned with each other and are not continuous.

In an electronic component module with leads according to a preferred embodiment of the present invention, it is preferable that the end surface of the first lead to mount one end of the electronic component protrudes as compared with the end surface of the second lead to mount one end of the electronic component.

In an electronic component module with leads according to a preferred embodiment of the present invention, it is preferable that, an insulating material is provided between the metal wire exposed portions.

In an electronic component module with leads according to a preferred embodiment of the present invention, it is preferable that, the insulating material covers a portion of the metal wire exposed portion.

In an electronic component module with leads according to a preferred embodiment of the present invention, it is preferable that, the insulating material does not cover the metal wire exposed portion.

In an electronic component module with leads according to a preferred embodiment of the present invention, it is preferable that, the insulating material extends to a side wall of the electronic component between the two terminal electrodes.

In an electronic component module with leads according to a preferred embodiment of the present invention, it is preferable that, the first and second leads, the electronic component are fixed to each other by the insulating material.

In an electronic component module with leads according to a preferred embodiment of the present invention, it is preferable that, a plurality of the electronic components are mounted on the first lead and the second lead at a predetermined interval.

In an electronic component module with leads according to a preferred embodiment of the present invention, it is preferable that, the electronic component is a thermistor.

In an electronic component module with leads according to a preferred embodiment of the present invention, it is preferable that, the thermistor is a surface-mount thermistor.

In an electronic component module with leads according to a preferred embodiment of the present invention, it is preferable that, the surface-mount thermistor includes an internal electrode.

A method of manufacturing an electronic component module with leads according to a preferred embodiment of the present invention is a method for mounting an electronic component including terminal electrodes at both ends of the electronic component body onto first and second leads formed by covering metal wires with insulating members and arranged side-by-side, the method including forming metal wire exposed portions where the metal wires are exposed respectively from the first and second leads on joint surfaces of the first and second leads on a same side used to join to the terminal electrodes, and separating the metal wire exposed portion of the first lead from the metal wire exposed portion of the second lead by a predetermined interval in a lead length direction, applying solder to the metal wire exposed portion of the first and second leads, respectively, and bringing the terminal electrodes into contact with the solder of the metal wire exposed portions of the first and second leads, respectively, and heating the solder to melt so that the terminal electrodes are respectively joined to the metal wire exposed portions of the first and second leads.

In a method of manufacturing an electronic component module with leads according to a preferred embodiment of the present invention, it is preferable that, the electronic component is provided with a predetermined angle between the longitudinal direction and the lead length direction.

In a method of manufacturing an electronic component module with leads according to a preferred embodiment of the present invention, it is preferable that, the longitudinal direction is parallel or substantially parallel to the lead length direction.

In a method of manufacturing an electronic component module with leads according to a preferred embodiment of the present invention, it is preferable that the method further includes a step of applying an insulating material between the metal wire exposed portions of the first and second leads.

In a method of manufacturing an electronic component module with leads according to a preferred embodiment of the present invention, it is preferable that, when the insulating material is applied between the metal wire exposed portions, the insulating material also covers a portion of the metal wire exposed portions.

According to another preferred embodiment of the present invention, a method of manufacturing an electronic component module with leads, for mounting an electronic component including terminal electrodes at both ends of the electronic component body onto first and second leads formed by covering metal wires with insulating members and arranged side-by-side, includes applying an insulating material to joint surfaces of the first and second leads on a same side which are used to join to the terminal electrodes, as well as its periphery thereof, removing the insulating members as well as the insulating material for forming metal wire exposed portions where the metal wires are exposed respectively from the first and second leads, and separating the metal wire exposed portion of the first lead and the metal wire exposed portion of the second lead from each other by a predetermined interval in the lead length direction, applying solder to the metal wire exposed portion of the first and second leads, respectively, and bringing the terminal electrodes into contact with the solder of the metal wire exposed portions of the first and second leads, respectively, and heating the solder to melt so that the terminal electrodes are respectively joined to the metal wire exposed portions of the first and second leads.

According to preferred embodiments of the present invention, since the metal wire exposed portions are formed on the joint surfaces of the first and second leads on the same side, the solder can be applied to the metal wire exposed portions to ensure conduction, even if the diameter of the first and second leads are small, it is possible to control the solder coating amount and the joining area by controlling the area of the metal wire exposed portions, to ensure a sufficient solder joint surface, and thus obtain increased joint strength as well as improved reliability and environmental resistance. Meanwhile, since the metal wire exposed portions of the first and second leads are spaced apart from each other by a predetermined interval in the lead length direction, bridging or migration of the solder is less likely to occur even if more solder is applied, so that the short circuit between the terminal electrodes of the electronic components is avoided, and the short-circuit failure is less likely to occur.

According to preferred embodiments of the present invention, since the electronic components are mounted on the joint surfaces of the first and second leads on the same side, it is not necessary to perform end surface machining for the front ends of the first and second leads, and is possible to eliminate the restriction of the cutting process when the diameter of the first and second leads is small, thus to obtain a smaller electronic component module with leads with low cost, sufficient stability, and stable reliability in terms of heat and mechanical. Furthermore, when the thermistor is mounted on the joint surfaces of the first and second leads on the same side, the electronic components do not fall off before the solder melts, therefore, the position of the electronic components does not need to be fixed before soldering, which is easy to process.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6A to 6C are a top view, a side view, and a front view, respectively, illustrating an example of a thermistor module with leads according to a third preferred embodiment of the present invention.

FIGS. 10A to 10C are a top view, a side view, and a front view, respectively, illustrating another example of a thermistor module with leads according to the fourth preferred embodiment of the present invention.

FIGS. 12A to 12C are a top view, a side view, and a front view, respectively, illustrating another example of a thermistor module with leads according to the fifth preferred embodiment of the present invention.

FIGS. 13A to 13C are a top view, a side view, and a front view, respectively, illustrating an example of a thermistor module with leads according to a sixth preferred embodiment of the present invention.

DETAILED DESCRIPTION OF THE PREFERRED EMBODIMENTS

Hereinafter, preferred embodiments of the present invention will be described in detail with reference to the accompanying drawings. Here, the same reference numbers are assigned to the same structures, and the repetitive description is omitted.

First Preferred Embodiment

The present preferred embodiment provides a thermistor module with leads (also referred to as a temperature sensor) as an electronic component module with leads.

Figure 1A:
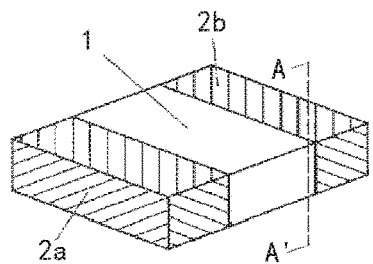
FIG. 1A is a diagram illustrating a thermistor used in a thermistor module with leads according to a first preferred embodiment of the present invention.
Figure 1B:
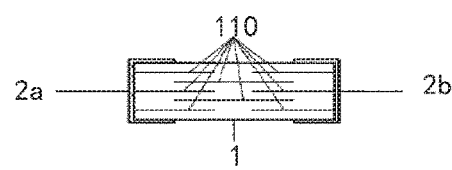
FIG. 1B is a cross-sectional view taken along the line A-A' in FIG. 1A.

First, a thermistor module with leads according to the first preferred embodiment of the present invention will be described. FIG. 1A is a diagram illustrating a thermistor 1 used in a thermistor module with leads concerning the present preferred embodiment, FIG. 1B is a cross-sectional view taken along the line A-A' in FIG. 1A.

As shown in FIG. 1A, the thermistor 1 is preferably a surface-mount thermistor including an internal electrode. The thermistor 1 includes a thermistor body mainly composed of ceramic material, and two terminal electrodes 2a, 2b formed at both ends of the thermistor body by a firing process or the like. The terminal electrodes 2a, 2b are made of conductive material such as Ag, Cu, Ni, Sn or the like. In addition, as shown in FIG. 1B, the internal electrode 110 is provided inside the thermistor body.

The electronic component is preferably a thermistor, and leads can be welded and fixed to a control board such as a printed circuit board, the thermistor mounted on the lead can be extended with the lead and placed in a target location where temperature sensing is required or heat changes may occur.

Furthermore, by using a surface-mount thermistor, the distance between the terminal electrodes is able to be larger, and it is difficult to generate a migration, so that the short circuit between the terminal electrodes is effectively and reliably prevented. In addition, since the thermistor includes an internal electrode, it is difficult to produce the electrode peeling, and the influence on the resistance value is small even when the electrode is peeled off.

Figure 2A:
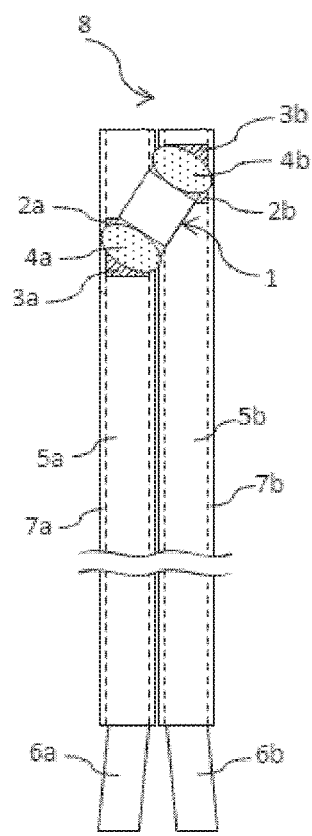
FIGS. 2A to 2C are a top view, a side view, and a front view, respectively, illustrating a thermistor module with leads according to the first preferred embodiment of the present invention.
Figure 2B:
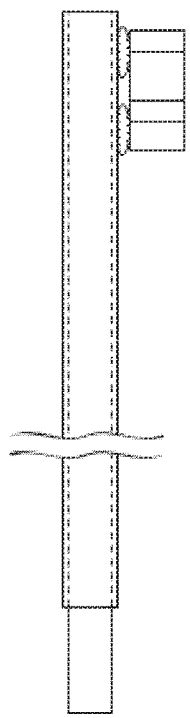
Figure 2C:
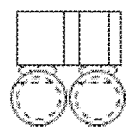

FIGS. 2A to 2C are a top view, a side view, and a front view, respectively, illustrating a thermistor module 8 with leads concerning the first preferred embodiment of the present invention.

As shown in FIGS. 2A to 2C, the first and second leads 5a, 5b are arranged side by side. The first lead 5a and the second lead 5b may be joined as a whole in the lead length direction to define a set of parallel leads. Further, the first lead and the second lead may not be joined as a whole.

In the first and second leads 5a and 5b, the metal wire (core) 6a is covered with the insulating member 7a, and the metal wire (core) 6b is covered with the insulating member 7b. The metal wires 6a and 6b may be any material that can be welded, and there is no specific limitation. For example, it may be iron, nickel, copper or metal alloy, preferably copper having good compatibility with tin solder. The insulating members 7a and 7b may be any heat-resistant material that can withstand reflow soldering process, and there is no specific limitation. For example, it may be an insulating material such as urethane resin or acrylic resin or the like.

As shown in FIG. 2A, in the first lead 5a, on a joint surface thereof to join to one terminal electrode 2a of the thermistor 1, a metal wire exposed portion 3a where the metal wire 6a is exposed from the first lead 5a by stripping a portion of the insulating member 7a is provided. Similarly, in the second lead 5b, on a joint surface thereof located on the same side with the joint surface of the first lead 5a, to join to the other terminal electrode 2b of the thermistor 1, a metal wire exposed portion 3b where the metal wire 6b is exposed from the second lead 5b by stripping a portion of the insulating member 7b is provided.

The metal wire exposed portion 3a of the first lead 5a and the metal wire exposed portion 3b of the second lead 5b are spaced apart by a predetermined interval L (see FIGS. 3A to 3C) in the lead length direction. The predetermined interval L is a distance between the adjacent edges of the metal wire exposed portions 3a, 3b of the first and second leads in the lead length direction. In the first preferred embodiment, the predetermined distance L between the adjacent edges of the metal wire exposed portions 3a and 3b of the first and second leads 5a and 5b in the lead length direction satisfies the following relationship: L>0 and is smaller than a distance between two terminal electrodes 2a, 2b of the thermistor 1.

Figure 3A:
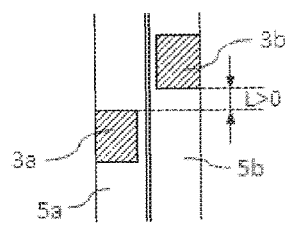
FIGS. 3A to 3C illustrate different shapes of metal wire exposed portions in a thermistor module with leads in a top view according to the first preferred embodiment of the present invention.
Figure 3B:
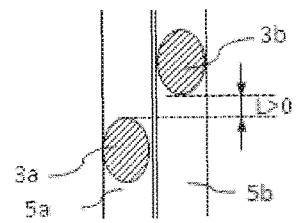
Figure 3C:
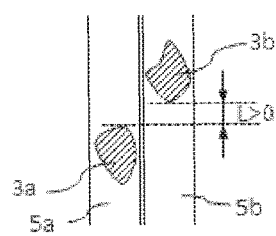

In a top view, the metal wire exposed portions 3a and 3b of the first and second leads 5a and 5b may be of any shape, for example, as shown in FIGS. 3A to 3C, respectively, rectangular, oval, and an irregular shape.

In addition, the metal wire exposed portion 3a is coated with a solder 4a, and the metal wire exposed portion 3b is coated with a solder 4b. The solder 4a and 4b are composed of Sn—Ag—Cu, for example. Taking advantage of the solder 4a and 4b coated on the metal wire exposed portions 3a and 3b of the first and second leads 5a and 5b, one terminal electrode of the thermistor 1 is electrically connected to the metal wire exposed portion 3a of the first lead 5a, and the other terminal electrode of the thermistor 1 is electrically connected to the metal wire exposed portion 3b of the second lead 5b.

Specifically, when the solder 4a, 4b coated on the metal wire exposed portions 3a, 3b is heated to melt, the thermistor 1 can naturally move to a stable position and be fixed under an action of a surface tension of the solder. Therefore, the thermistor 1 is finally mounted on the first and second leads 5a and 5b in an inclined manner so as to have a predetermined angle between the longitudinal direction and the lead length direction. According to the structure, the thermistor element can automatically adjust the position, experiences only little or no stress, is not easy to break, and has a high environmental resistance. In addition, the joining area of the terminal electrodes 2a, 2b and the metal wire exposed portions 3a and 3b is large, and the round angle is defined at the center of the electrode so that the joining reliability is high, as a result, the reliability of the electrical characteristic is also high.

Figure 20:
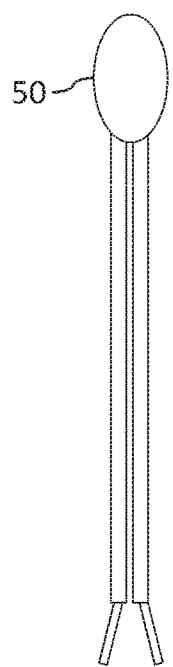
FIG. 20 illustrates an example of a configuration of an electronic component module with leads according to the first to sixth preferred embodiments of the present invention.

Moreover, FIG. 20 illustrates an example of a configuration of an electronic component module with leads according to the present preferred embodiment. As shown in FIG. 20, the electronic component module may further include an insulating resin 50 which packages a front end of the first and second leads on which the electronic component is mounted. By using the insulating resin 50 to package, the environmental adaptability of the electronic component module is improved.

Hereinafter, the manufacturing steps of the thermistor module with leads will be described in detail with reference to FIGS. 4A to 4F.

Figure 4A:
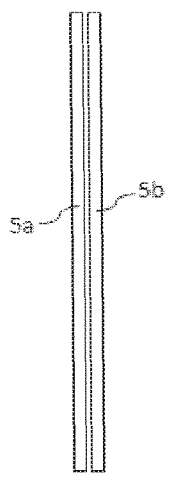
FIGS. 4A to 4F illustrate manufacturing steps of a thermistor module with leads according to the first preferred embodiment of the present invention.

First of all, as shown in FIG. 4A, prepare two metal wires covered with insulating members to form parallel leads 5a, 5b arranged side by side.

Figure 4B:
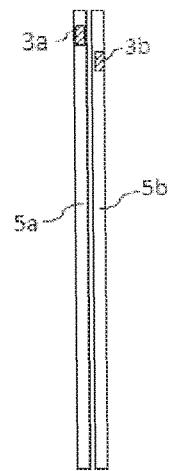

Next, as shown in FIG. 4B, on the joint surfaces of the first and second leads 5a, 5b on the same side and used to join with the terminal electrodes 2a, 2b of the thermistor 1, metal wires are exposed from the first and second leads 5a, 5b by stripping a certain area of the insulating member, respectively, therefore metal wire exposed portions 3a, 3b are formed. The metal wire exposed portions 3a, 3b do not overlap each other in the lead length direction and are spaced apart with a predetermined interval L. In the present preferred embodiment, L>0 and is smaller than a distance between two terminal electrodes 2a, 2b of the thermistor 1.

Figure 4C:
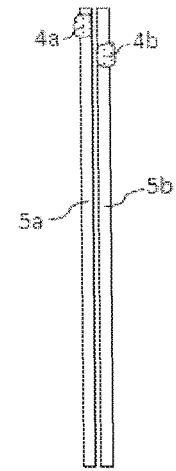

Next, as shown in FIG. 4C, the metal wire exposed portions 3a and 3b are respectively coated with solder 4a and 4b. The solder 4a and 4b are composed of Sn—Ag—Cu, for example.

Figure 4D:
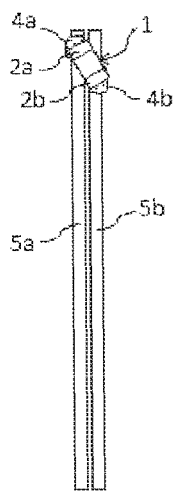

Then, as shown in FIG. 4D, two terminal electrodes 2a, 2b of the thermistor 1 are respectively in contact with solder 4a, 4b.

Figure 4E:
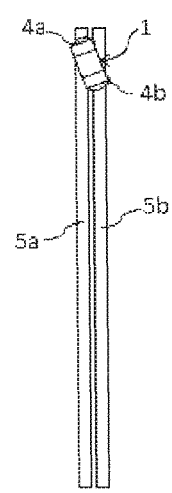

Next, as shown in FIG. 4E, the solder is melted in a heating process at a specific temperature for a specific period of time, so that the terminal electrodes 2a, 2b of the thermistor 1 are joined and fixed to the metal wire exposed portions 3a, 3b by soldering. The thermistor 1 moves to a stable position naturally and is fixed under an action of a surface tension of the solder. According to the first preferred embodiment, the thermistor 1 is finally mounted on the first and second leads 5a, 5b in an inclined manner so as to have a predetermined angle with respect to the length direction of the first and second leads 5a, 5b.

Figure 4F:
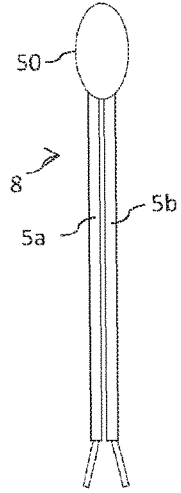

Then, as shown in FIG. 4F, the insulating resin 50 used for packaging is applied to cover the first and second leads 5a and 5b, the solder and the thermistor 1, and then solidification treatment is performed at a specific temperature for a specific period of time. As a result, a thermistor module 8 with leads is manufactured.

In addition, an area of the metal wire exposed portions 3a, 3b of the first and second leads 5a, 5b is equal to or greater than the joining area of the terminal electrodes 2a, 2b of the thermistor 1 and the corresponding metal wire exposed portions (the area of a joint surface where the terminal electrode is connected to the metal wire exposed portion by soldering), preferably that the area of the metal wire exposed portions 3a, 3b of the first and second leads 5a, 5b is equal to or slightly greater than an area of an end surface portion of the terminal electrodes 2a, 2b of the thermistor 1 used to join to the corresponding metal wire exposed portions. In addition, the adjacent edges of the metal wire exposed portions 3a, 3b in the lead length direction are respectively overlapped with the attaching surfaces of the terminal electrodes 2a, 2b of the thermistor 1.

In addition, the thermistor 1 can be installed after the first and second leads 5a, 5b are cut to a proper length, and the lead cutting can also be performed after the installation of the thermistor 1 is finished by soldering.

As mentioned above, according to the first preferred embodiment, since the metal wire exposed portions are formed on the joining surfaces of the first and second leads on the same side, the solder can be applied to the metal wire exposed portions to ensure conduction, even if the diameter of the first and second leads are small, it is possible to control the solder coating amount and the joining area by controlling the area of the metal wire exposed portions, to ensure a sufficient solder joint surface, to thus obtain a strong joint strength as well as improved reliability and environmental resistance. Meanwhile, since the metal wire exposed portions of the first and second leads are spaced apart from each other by a predetermined interval in the lead length direction, bridging or migration of the solder is less likely to occur even if more solder is applied, so that the short circuit between the terminal electrodes of the thermistor is avoided, and the short-circuit failure is less likely to occur. In addition, a short-circuit failure is not likely to occur even if the thermistor is not covered with the insulator as in China Patent Publication No. 101583858.

According to the first preferred embodiment, since the thermistor is mounted on the joint surfaces of the first and second leads on the same side, it is not necessary to perform end surface machining for the front ends of the first and second leads, and is possible to eliminate the restriction of the cutting process when the diameter of the first and second leads is small, and the stress for the thermistor is small in the lead length direction, to thus obtain a smaller thermistor module with leads with low cost, sufficient stability, and stable reliability in terms of heat and mechanical. Furthermore, when the thermistor is mounted on the joint surfaces of the first and second leads on the same side, the thermistor does not fall off before the solder melted, therefore, the position of the thermistor does not need to be fixed before soldering, which is easy to process.

In addition, according to the first preferred embodiment, the terminal electrodes of the thermistor are electrically connected to the metal wire exposed portions of the first and second leads by soldering, when melting the solder during processing, the thermistor can naturally move to a stable position and be fixed under an action of a surface tension of the solder, as a result, placing position of the thermistor does not need to be strictly controlled before soldering, as long as the dimensional accuracy of the thermistor itself is controlled, it is possible to ensure that the thermistor stably rests in the proper position, making it easy to process.

In addition, according to the first preferred embodiment, the area of the metal wire exposed portions is equal to or greater than the joining area between the terminal electrodes of the thermistor and the metal wire exposed portions, so that sufficient exposed portions of metal wires are ensured, and a sufficient area of the solder joint portion is guaranteed, and the distance between the respective metal wire exposed portions of the first and second leads and the terminal electrodes of the thermistor gets closer, thereby, the solder joint strength and the environmental resistance are ensured, and particularly the resistance to thermal shock is improved.

Besides, according to the first preferred embodiment, the thermistor can also be a chip resistor, a chip capacitor, a chip inductor, a piezoelectric element and other chip electronic components with electrodes at both ends.

Second Preferred Embodiment

Next, an electronic component module with leads according to the second preferred embodiment will be described. In the second preferred embodiment, it is still preferred to use a thermistor module with leads (also referred to as a temperature sensor) as an electronic component module with leads, for the same reason as in the first preferred embodiment. The thermistor module with leads according to the second preferred embodiment differs from the first preferred embodiment in that, in the first preferred embodiment, the thermistor is provided with a predetermined angle between the longitudinal direction and the length direction of the first and second leads, but in the second preferred embodiment, the thermistor is provided that the longitudinal direction is parallel or substantially parallel to the length direction of the first and second leads. In the following, only the differences will be described.

Figure 5A:
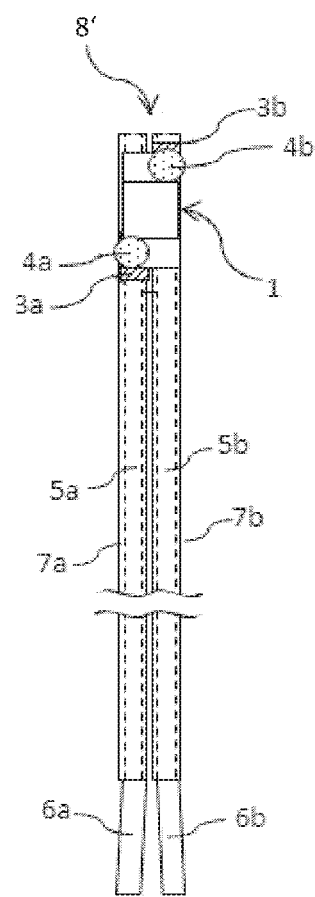
FIGS. 5A to 5C are a top view, a side view, and a front view, respectively, illustrating a thermistor module with leads according to a second preferred embodiment of the present invention.
Figure 5B:
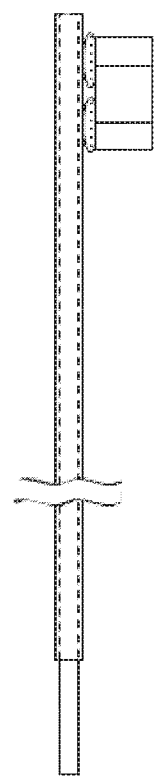
Figure 5C:

FIGS. 5A to 5C are a top view, a side view, and a front view, respectively, illustrating a thermistor module with leads according to the second preferred embodiment of the present invention.

Specifically, in the second preferred embodiment, the predetermined interval in the lead length direction of the metal wire exposed portions $3a$, $3b$ is equal to or slightly larger than the distance between the two terminal electrodes of the thermistor 1. As a result, the thermistor 1 can be mounted on the joint surfaces of the first and second leads on the same side in such a manner that the longitudinal direction of the thermistor 1 is parallel or substantially parallel to the length direction of the first and second leads.

According to the second preferred embodiment, the thermistor is provided such that the longitudinal direction of the thermistor is parallel or substantially parallel to the length direction of the first and second leads, so that when the sum of outer diameter of the first and second leads is equal to or smaller than the width of the thermistor, the width in a direction perpendicular to the lead length direction is equal to the width of the thermistor, and is smaller than the width while the thermistor is provided in an inclined manner at a predetermined angle with respect to the first and second leads, therefore, compared with the first preferred embodiment, the miniaturization can be maximized.

Besides, according to the second preferred embodiment, the thermistor can also be a chip resistor, a chip capacitor, a chip inductor, a piezoelectric element and other chip electronic components with electrodes at both ends.

Moreover, FIG. 20 illustrates an example of a configuration of an electronic component module with leads according to the present preferred embodiment. As shown in FIG. 20, the electronic component module may further include an insulating resin 50 which packages the electronic component, as well as a front end of the first and second leads on which the electronic component is mounted. By using the insulating resin 50 to package, the environmental adaptability of the electronic component module is improved.

Third Preferred Embodiment

Next, an electronic component module with leads according to the third preferred embodiment will be described. In the third preferred embodiment, it is still preferred to use a thermistor module with leads (also referred to as a temperature sensor) as an electronic component module with leads, for the same reason as in the first preferred embodiment. In the third preferred embodiment, the metal wire exposed portions of the first and second leads respectively extend to the outer peripheral side of the corresponding lead, toward non-adjacent outer directions of the first and second leads.

In the third preferred embodiment, the metal wire exposed portions of the first and second leads are respectively coated with solder, if the solder can be applied in direct contact with the metal wire exposed portions, respectively, the solder coating may extend beyond the metal wire exposed portions and extend to the outer peripheral side of the corresponding lead toward non-adjacent outer directions of the first and second leads. In the case where it is ensured that the metal wire exposed portions of the first and second leads have a predetermined interval in the lead length direction, the area of the solder coating (i.e. the contact area between solder and the first and second leads) is slightly larger than the area of the corresponding metal wire exposed portion.

FIGS. 6A to 6C are a top view, a side view, and a front view, respectively, illustrating an example of a thermistor module with leads according to the third preferred embodiment of the present invention. This example corresponds to the case where the length direction of the thermistor and the length direction of the first and second leads have a predetermined angle.

Figure 7A:
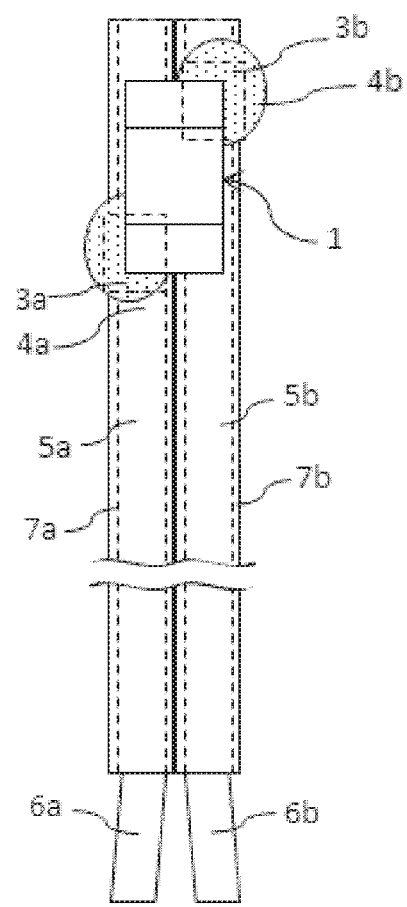
FIGS. 7A to 7C are a top view, a side view, and a front view, respectively, illustrating another example of a thermistor module with leads according to the third preferred embodiment of the present invention.
Figure 7B:
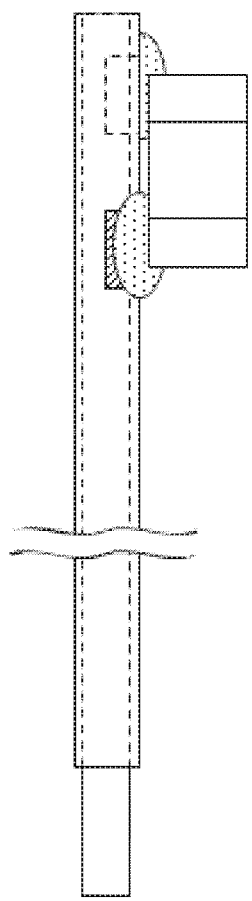
Figure 7C:
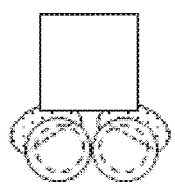
Figure 8:
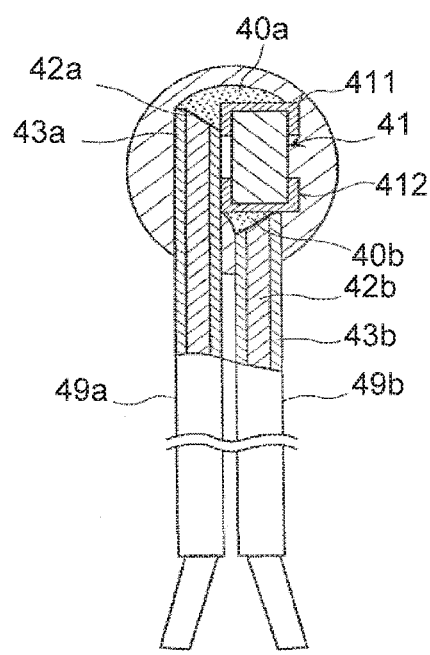
FIG. 8 illustrates a top view of a thermistor module with leads disclosed in China Patent Publication No. 101583858.

FIGS. 7A to 7C are a top view, a side view, and a front view, respectively, illustrating another example of a thermistor module with leads according to the third preferred embodiment of the present invention. This example corresponds to the case where the length direction of the thermistor is parallel or substantially parallel to the length direction of the first and second leads.

As can be seen from FIGS. 6A to 6C and FIGS. 7A to 7C, the metal wire exposed portions 3a and 3b of the first and second leads 5a and 5b extend to the outer peripheral side of the corresponding lead toward non-adjacent outer directions of the first and second leads 5a and 5b.

According to the third preferred embodiment, the metal wire exposed portions of the first and second leads extend to the out peripheral side of the corresponding lead toward non-adjacent outer directions of the first and second leads 5a and 5b, so that the solder coating amount applied to the metal wire exposed portions is more, the solder coating area becomes larger. Thus, the area of a solder joint portion becomes larger, with an increased joint strength that achieves stable and reliable joining.

In addition, since the solder is applied so as to extend toward the outer direction of the first and second leads to the outer peripheral side of the corresponding lead, even if the solder coating amount is large and the area is large, the metal wire exposed portions of the first and second leads still have sufficient intervals in the lead width direction, under the action of the solder surface tension, the solder will naturally shrink at the terminal electrodes at both ends of the thermistor during melting, which greatly avoids short-circuit failure. In addition, in the case where the solder is in direct contact with the metal wire exposed portions, it is not necessary to strictly control the solder coating position and the coating amount. Thus, the difficulty of operation is reduced as well as the costs, and the mass production processing is able to be achieved.

Besides, according to the third preferred embodiment, the thermistor can also be a chip resistor, a chip capacitor, a chip inductor, a piezoelectric element and other chip electronic components with electrodes at both ends.

Moreover, FIG. 20 illustrates an example of a configuration of an electronic component module with leads according to the present preferred embodiment. As shown in FIG. 20, the electronic component module may further include an insulating resin 50 which packages the electronic component, as well as a front end of the first and second leads on which the electronic component is mounted. By using the insulating resin 50 to package, the environmental adaptability of the electronic component module is improved.

Fourth Preferred Embodiment

Next, an electronic component module with leads according to the fourth preferred embodiment will be described. According to the fourth preferred embodiment, the electronic component may be a chip electronic component including an electrode at both ends, such as a chip resistor, a chip capacitor, a chip inductor, a piezoelectric element, and a thermistor, etc. In the fourth preferred embodiment, it is preferable that the electronic component is a thermistor.

The electronic component module according to the fourth preferred embodiment differs from the first preferred embodiment in that, in the fourth preferred embodiment, an end surface of the front end of the first lead to mount one end of the electronic component body and an end surface of the front end of the second lead to mount one end of the electronic component body are not aligned with each other and are not continuous. Here, "not aligned with each other and are not continuous" can be understood as the end surfaces of the first lead and the second lead are in different planes and edges of the both are not adjacent to each other.

In the following, only the differences will be described.

Figure 9A:
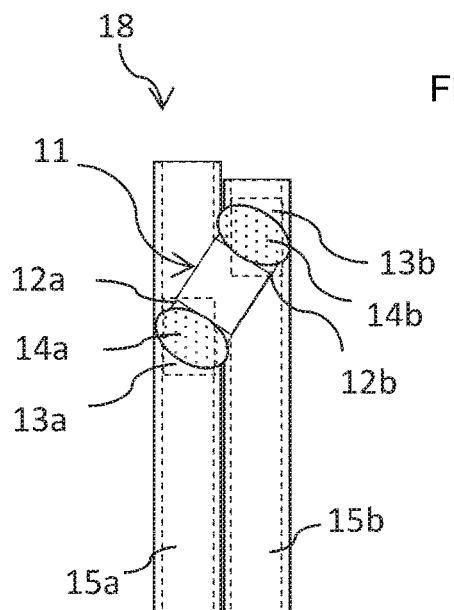
FIGS. 9A to 9C are a top view, a side view, and a front view, respectively, illustrating an example of a thermistor module with leads according to a fourth preferred embodiment of the present invention.
Figure 9B:
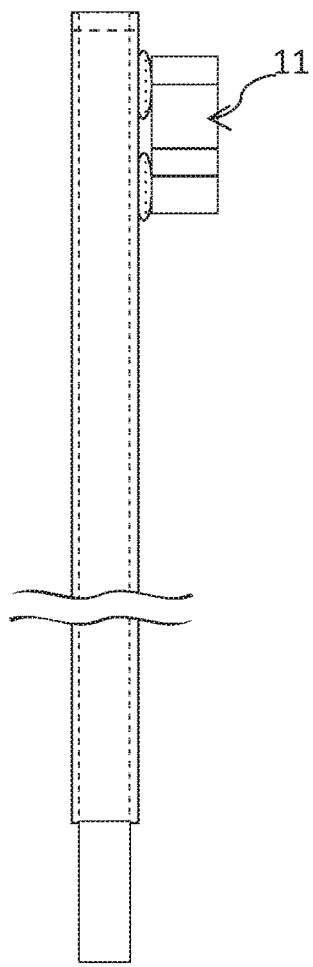
Figure 9C:
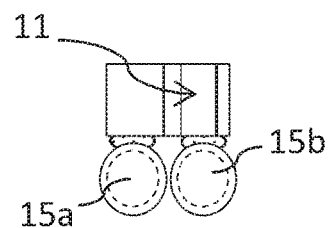

FIGS. 9A to 9C are a top view, a side view, and a front view, respectively, illustrating an example of an electronic component module with leads according to the fourth preferred embodiment of the present invention. As shown in FIGS. 9A to 9C, the end surface of the first lead 15a to mount one end of an electronic component 11 and the end surface of the second lead 15b to mount one end of the electronic component 11 form a segment difference, that is, the end surface of the first lead 15a to mount one end of the electronic component 11 is more protruded than the end surface of the second lead 15b to mount one end of the electronic component 11. It also can be the that, the first lead 15a extends longer in the length direction with respect to the second lead 15b, so that the edge of the end surface of the first lead 15a and the edge of the end surface of the second lead 15b are not adjacent and cannot come into contact with each other.

FIGS. 10A to 10C are a top view, a side view, and a front view, respectively, illustrating another example of an electronic component module with leads according to the fourth preferred embodiment of the present invention. As shown in FIGS. 10A to 10C, the end surface of the first lead 15a to mount one end of the electronic component 11 and the end surface of the second lead 15b to mount one end of the electronic component 11 form a segment difference, specifically, the end surface of the second lead 15b to mount one end of the electronic component 11 is more protruded than the end surface of the first lead 15a to mount one end of the electronic component 11. It also can be the that, the second lead 15b extends longer in the length direction with respect to the first lead 15a, so that the edge of the end surface of the first lead 15a and the edge of the end surface of the second lead 15b are not adjacent and cannot come into contact with each other.

When cutting off the first lead 15a and the second lead 15b covering an insulating layer, incisions with metal burrs or other form of irregular incisions may sometimes be formed. If the front end of the first lead 15a is aligned with the front end of the second lead 15b, it is still easy to make the contact between the conductors, and thus a short-circuit failure occurs. The top end surfaces of the first lead 15a and the second lead 15b are formed in the form shown in the FIGS. 9A to 9C, FIGS. 10A to 10C by cutting or other processes, thus the risk of the above short-circuit failure is reduced.

Moreover, FIG. 20 illustrates an example of a configuration of an electronic component module with leads according to the present preferred embodiment. As shown in FIG. 20, the electronic component module may further include an insulating resin 50 which packages the electronic component, as well as a front end of the first and second leads on which the electronic component is mounted. By using the insulating resin 50 to package, the environmental adaptability of the electronic component module is improved.

Fifth Preferred Embodiment

Next, an electronic component module with leads according to the fifth preferred embodiment will be described.

According to the fifth preferred embodiment, the electronic component may be a chip electronic component having two electrodes, such as a chip resistor, a chip capacitor, a chip inductor, a piezoelectric element, and a thermistor, etc. In the fifth preferred embodiment, it is preferable that the electronic component is a thermistor.

The electronic component module according to the fifth preferred embodiment differs from the first preferred embodiment in that, in the fifth preferred embodiment, the electronic component is rectangular parallelepiped, a gap or a space having a V-shaped cross-sectional shape is provided between the first lead and the second lead, and a long side of the electronic component falls into and is accommodated in the gap or the space having a V-shaped cross-sectional shape.

In the following, only the differences will be described.

Figure 11A:
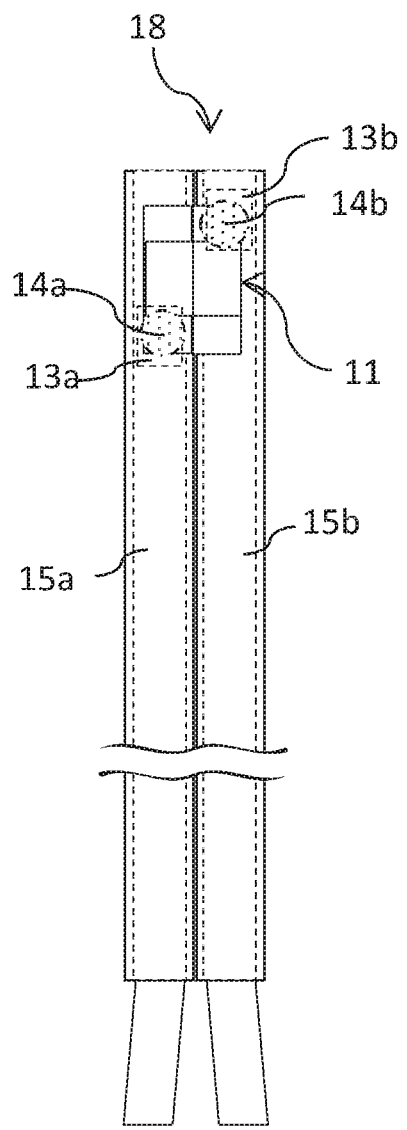
FIGS. 11A to 11C are a top view, a side view, and a front view, respectively, illustrating an example of a thermistor module with leads according to a fifth preferred embodiment of the present invention.
Figure 11B:
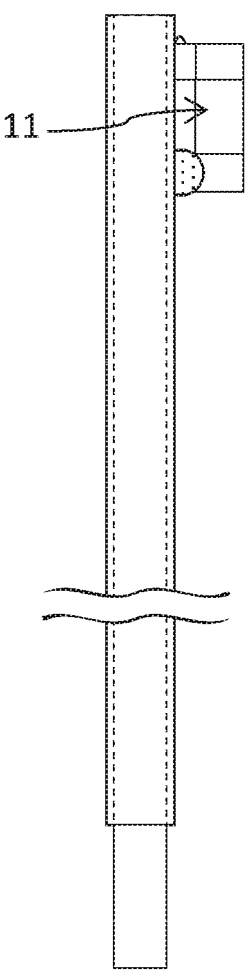
Figure 11C:
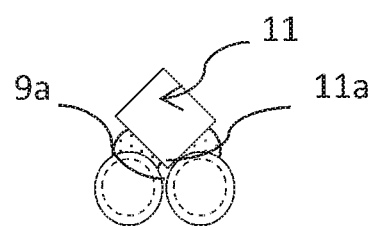

FIGS. 11A to 11C are a top view, a side view, and a front view, respectively, illustrating an example of an electronic component module with leads according to the fifth preferred embodiment of the present invention. As shown in FIGS. 11A to 11C, a first lead 15a and a second lead 15b are cylinders, and the first lead 15a and the second lead 15b are brought into close contact with each other to define a V-shaped groove 9a. Here, for the "V-shaped", it should be understood by those skilled in the art that, it does not refer to an absolute V-shape, it should include a shape similar to the V-shape, for example, the line has a certain degree of curvature or a range of deformation. The electronic component 11 preferably is rectangular parallelepiped, when the electronic component 11 is mounted on the first lead 15a and the second lead 15b, a long side 11a of the electronic component 11 falls into the groove 9a. In addition, the V-shaped groove, or space can also be replaced by a groove, or space of U-shape, or having a concave section.

FIGS. 12A to 12C are a top view, a side view, and a front view, respectively, illustrating another example of an electronic component module with leads according to the fifth preferred embodiment of the present invention. As shown in FIGS. 12A to 12C, a gap 9a is left between the first lead 15a and the second lead 15b. The electronic component 11 is rectangular parallelepiped, when the electronic component 11 is mounted on the first lead 15a and the second lead 15b, a long side 11a of the electronic component 11 falls into the gap 9a.

According to the structure shown in FIGS. 11A to 11C, or FIGS. 12A to 12C, the electronic component is able to be stably mounted on the first lead 15a and the second lead 15b. In some cases, the structure may have better stability, for example, the longer side 11a of the electronic component is longer, or the diameter of the lead is larger.

Moreover, FIG. 20 illustrates an example of a configuration of an electronic component module with leads according to the present preferred embodiment. As shown in FIG. 20, the electronic component module may further include an insulating resin 50 which packages the electronic component, as well as a front end of the first and second leads on which the electronic component is mounted. By using the insulating resin 50 to package, the environmental adaptability of the electronic component module is improved.

Sixth Preferred Embodiment

Next, an electronic component module with leads according to the sixth preferred embodiment will be described. According to the sixth preferred embodiment, the electronic component may be a chip electronic component including an electrode at both ends, such as a chip resistor, a chip capacitor, a chip inductor, a piezoelectric element, and a thermistor, etc. In the sixth preferred embodiment, it is preferable that the electronic component is a thermistor.

The electronic component module with leads according to the sixth preferred embodiment differs from the first preferred embodiment in that, an insulating material is coated between metal wire exposed portions. Since two electrodes of the electronic component are mounted and welded to metal wire exposed portions, there is still a slight risk of short-circuit after welding, although there are insulating members used to isolate the electrical conduction between metal wire exposed portions, for example, the solder of the two electrodes of the electronic component may extend and contact with each other, therefore, it is possible to coat insulating material between metal wire exposed portions to reduce the risk of the short circuit. On the other hand, preferably, the insulating material may further have an adhesive property, or may be welded, for example, as a connecting method, an epoxy resin in a molten state may be used at the metal wire exposed portions, especially at adjacent area of the first lead, the second lead, and the electronic component, and thus the above three may be welded and fixed to each other, in this way, not only the risk of the above-mentioned short-circuit can be reduced, but also the structure of the electronic component module with leads of the present preferred embodiment is more stable and less susceptible to external shock, at the same time, it is possible to prevent the electronic component from falling off from the first lead and the second lead while manufacturing.

In the following, only the differences will be described.

FIGS. 13A to 13C are a top view, a side view, and a front view, respectively, illustrating an example of an electronic component module with leads according to the sixth preferred embodiment of the present invention. As shown in FIGS. 13A to 13C, between metal wire exposed portions 13a and 13b, an insulating material 19 having an adhesive property, such as an epoxy resin, is coated. Specifically, the insulating material 19 is coated between metal wire exposed portions 13a and 13b and is located at adjacent area of the first lead 15a and the second lead 15b.

According to above structure, the insulating material 19 is located between the metal wire exposed portions 13a, 13b and is therefore also located between the electrodes 12a, 12b of electronic component 11 and between solder 14a, 14b. As a result, the risk of short-circuit between the solder 14a, 14b and between the electrodes 12a, 12b is reduced. At the same time, taking advantage of adhesive property of the insulating material 19, the first lead 15a, the second lead 15b, and the electronic component are fixed to each other by the adhesion. The structure of electronic component module 18 with leads is more stable and less susceptible to external shock, meanwhile, it is possible to prevent the electronic component 11 from being affected by vibration or the like, which causing the mount position to be shifted or falling off from the first lead 12a and the second lead 12b.

In addition, the insulating material 19 may also extend to the side walls (not shown) of the electronic component 11 between the two terminal electrodes 12a, 12b. That is, after electronic component 11 is mounted and welded to metal wire exposed portions 13a and 13b, the insulating material 19 is not only located at adjacent area of the first lead 15a, the second lead 15b and the electronic element 11, but also extends and is adhered to the side wall of the electronic component 11 located between the two terminal electrodes 12a and 12b through melting, coating, deformation and other processes, and the insulating material 19 may cover a portion or all of the side wall. The effect of the above structure is: the electronic component 11 itself is likely to be a semiconductor material, and if the insulating material 19 covers all of the side wall, the influence on the characteristics of the electronic component due to the solder extension on the terminal electrodes 12a, 12b is reduced, on the other hand, such structure further prevents the solder extension on the terminal electrodes 12a, 12b from causing a short-circuit.

Figure 14:
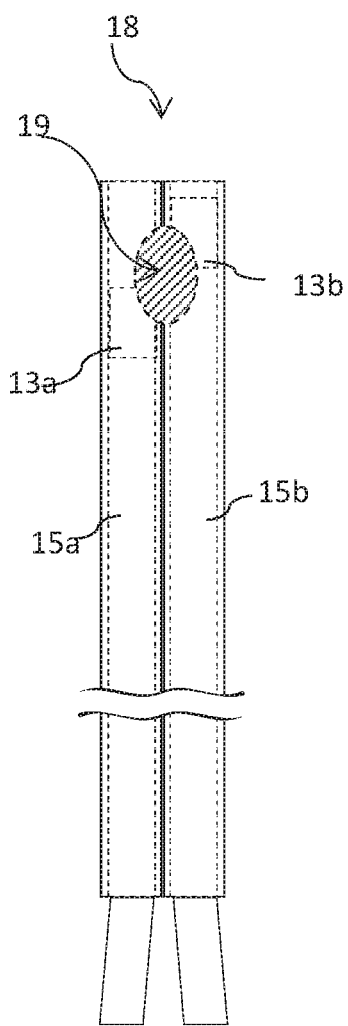
FIG. 14 illustrates a top view of another example of a thermistor module with leads according to the sixth preferred embodiment of the present invention.

FIG. 14 illustrates a top view of another example of an electronic component module with leads according to the sixth preferred embodiment of the present invention. As shown in FIG. 14, in this example, an insulating material 19 having an adhesive property is also provided between metal wire exposed portions 13a and 13b, the coverage of insulating material 19 is increased so that a portion of metal wire exposed portions 13a, 13b is covered by the insulating material 19. As a result, the short-circuit risk is further reduced. Even if the distance between metal wire exposed portions 13a, 13b is very small, it is difficult for the solder to bypass the area covered by the insulating material 19 to cause a short-circuit.

Figure 15:
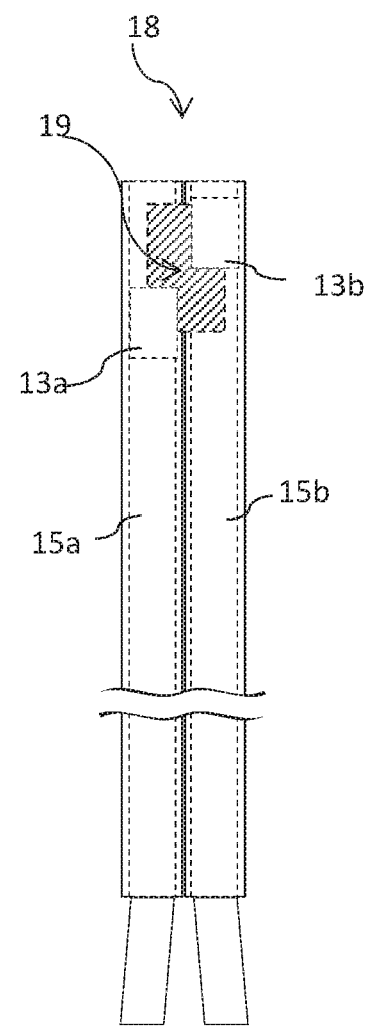
FIG. 15 illustrates a top view of another example of a thermistor module with leads according to the sixth preferred embodiment of the present invention.

FIG. 15 illustrates a top view of another example of an electronic component module with leads according to the sixth preferred embodiment of the present invention. As shown in FIG. 15, in this example, the coverage of the insulating material 19 is able to be further increased, thus more effectively reducing the above-mentioned short-circuit risk. However, the metal wire exposed portions 13a, 13b are completely exposed, not covered by insulating material 19. Since the insulating material 19 does not cover the metal wire exposed portions 13a, 13b, the metal wire exposed portions 13a, 13b can be brought into more sufficient contact with the electrodes of electronic component 11. Meanwhile the manufacturing process can also be more simplified (please refer to the method section below).

The sixth preferred embodiment also relates to a method of manufacturing the above-described electronic component module with leads.

As shown in FIGS. 16A to 16G, one example of manufacturing steps of above-described electronic component module with leads include the following steps.

Figure 16A:
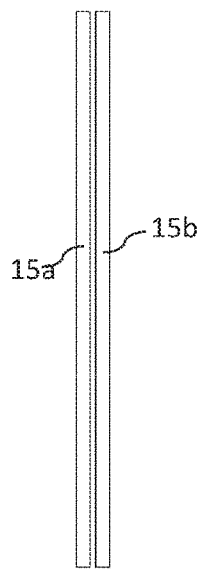
FIGS. 16A to 16G illustrate an example of a method of manufacturing a thermistor module with leads according to the sixth preferred embodiment of the present invention.

Step a, as shown in FIG. 16A, prepare two metal wires covered with an insulating member to form parallel leads 5a, 5b arranged side by side.

Figure 16B:
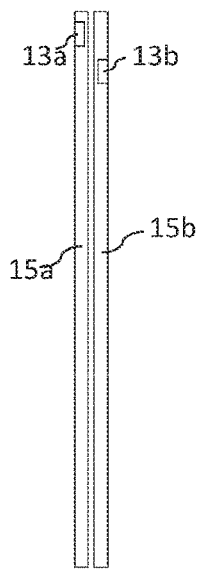

Step b, as shown in FIG. 16B, on the joint surfaces of the first and second leads 15a, 15b on the same side and used to join with the terminal electrodes 12a, 12b of the thermistor 1, metal wires are exposed from the first and second leads 15a, 15b by stripping a certain area of the insulating member, respectively, therefore metal wire exposed portions 13a, 13b are formed. The metal wire exposed portions 13a, 13b do not overlap each other in lead length direction and are spaced apart with a predetermined interval L.

Figure 16C:
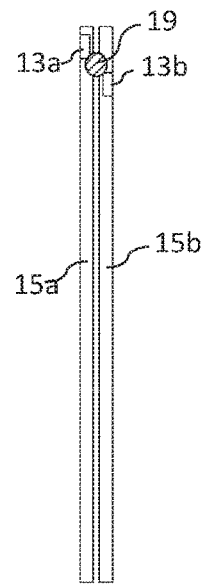

Step c, as shown in FIG. 16C, the insulating material 19 is coated between metal wire exposed portions 13a, 13b, the coverage of the insulating material 19 may include a portion of the metal wire exposed portions 13a, 13b (as shown in FIG. 14), or may be formed without covering the metal wire exposed portions 13a, 13b as shown in FIG. 13A. Insulating material 19 may be made of an epoxy resin or the like.

Figure 16D:
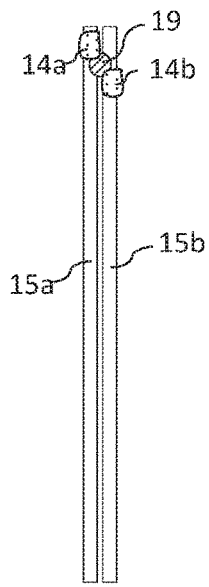

Step d, as shown in FIG. 16D, the metal wire exposed portions 13a and 13b are respectively coated with solder 14a and 14b. The solder 14a and 14b are composed of Sn—Ag—Cu, for example.

Figure 16E:
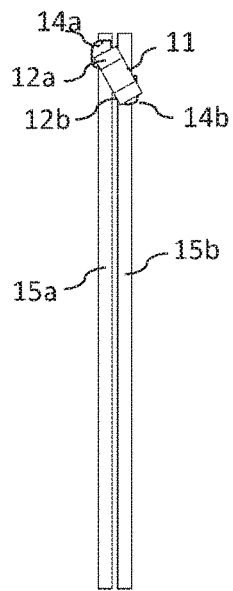

Step e, as shown in FIG. 16E, two terminal electrodes 12a, 12b of electronic component 11 are respectively in contact with solder 14a, 14b.

Figure 16F:
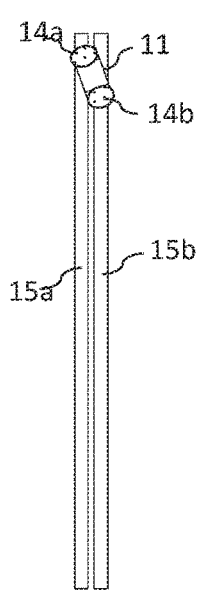

Step f, as shown in FIG. 16F, the solder is melted at a specific temperature for a specific period of time, so that the terminal electrodes 12a, 12b of electronic component 11 are joined and fixed to the metal wire exposed portions 13a, 13b by soldering. The electronic component 11 moves to a stable position naturally and fixed under an action of a surface tension of the solder. In the sixth preferred embodiment, the electronic component 11 is finally mounted on the first and second leads 15a, 15b in an inclined manner so as to have a predetermined angle with respect to the length direction of the first and second leads 15a, 15b.

Figure 16G:
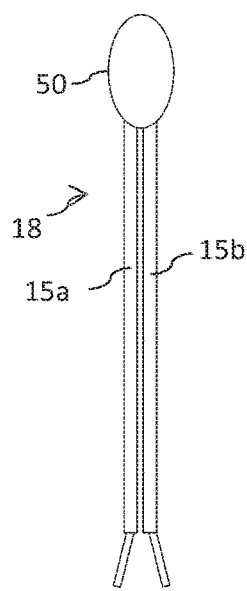

Step g, as shown in FIG. 16G, the insulating resin 50 used for packaging is applied to cover the first and second leads 15a and 15b, the solder and the electronic component 11, and then solidification treatment is performed at a specific temperature for a specific time, thus an electronic component module 18 with leads is manufactured.

In addition, an area of the metal wire exposed portions 13a, 13b of the first and second leads 15a, 15b is equal to or greater than the joining area of the terminal electrodes 12a, 12b of the electronic component 11 and the corresponding metal wire exposed portions (the area of a joint surface where the terminal electrode is connected to the metal wire exposed portion by soldering), preferably that the area of the metal wire exposed portions 13a, 13b of the first and second leads 15a, 15b is equal to or slightly greater than the area of an end surface portion of the terminal electrodes 12a, 12b of the electronic component 11 used to join to the corresponding metal wire exposed portions. In addition, the adjacent edges of the metal wire exposed portions 13a, 13b in the lead length direction are respectively overlapped with the attaching surfaces of the terminal electrodes 12a, 12b of the electronic component 11.

In addition, the electronic component 11 can be installed after the first and second leads 15a, 15b are cut to a proper length, and the lead cutting can also be performed after the installation of the electronic component 11 is finished by soldering.

Besides, the coated insulating material 19 may have an adhesive or a welding effect to fix electronic component 11 onto the first and second leads 15a, 15b. Thus, it is possible to ensure that the electronic component 11 does not shift or fall off due to the movement or vibration of the first and second leads 15a and 15b before the welding is completed. In addition, since the solder is in a molten state during welding, it is possible to prevent the electronic component 11 from being shifted due to contact, thermal expansion, shrinkage, and the like.

Figure 17A:
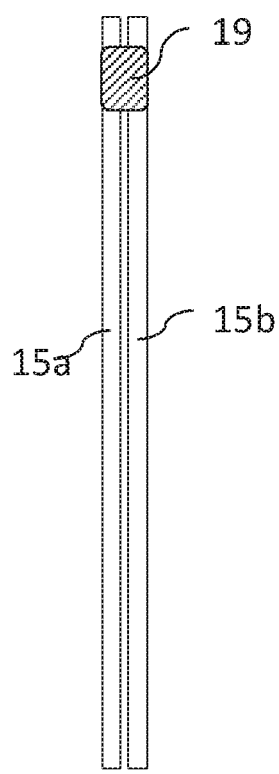
FIGS. 17A to 17B illustrate step b', step c' of another example of a method of manufacturing a thermistor module with leads according to the sixth preferred embodiment of the present invention.
Figure 17B:
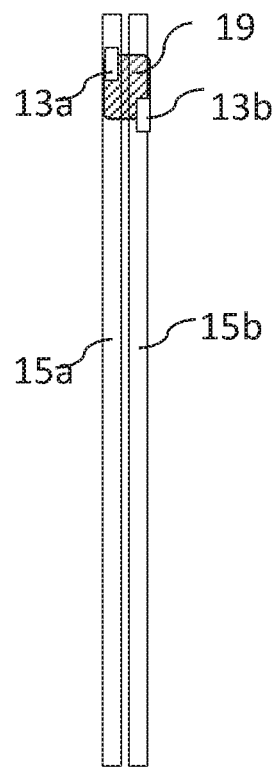

FIGS. 17A to 17B illustrate step b', step c' of another example in manufacturing steps of an electronic component module with leads according to the sixth preferred embodiment. The example is different from the example shown in FIGS. 16A to 16G in that, step b and step c are changed to step b', step c'. The steps b' and c' will be described in detail below. And since the other steps of the two examples are the same, they are not described here.

Step b', as shown in FIG. 17A, in the regions of the first and second leads 15a and 15b to mount the electronic component 11, the insulating material 19 is coated.

Step c', as shown in FIG. 17B, on the joint surfaces of the first and second leads 15a, 15b on the same side and used to join with the terminal electrodes 12a, 12b of the electronic component 11, metal wires are exposed from the first and second leads 15a, 15b by stripping a certain area of the insulating member and the insulating material 19 adhered to, respectively, therefore metal wire exposed portions 13a, 13b are formed. The metal wire exposed portions 13a, 13b do not overlap each other in the lead length direction and are spaced apart with a predetermined interval L. Thus, after metal wire exposed portions 13a and 13b are formed, the insulating material 19 is not adhered, but the partial edges of metal wire exposed portions 13a and 13b are surrounded by the insulating material 19.

That is, in the manufacturing steps of the electronic component module with leads as shown in FIGS. 17A to 17B, after the insulating material 19 is coated on the first and second leads 15a and 15b, a certain area of the insulating member is stripped together with the insulating material adhered thereto, so that metal wire exposed portions 13a and 13b are formed.

As a result, the insulating material 19 can be coated onto the first and second leads 15a and 15b at a relatively low accuracy (that is, there is no need for a very precise positioning of the coating for insulating material), so that the production efficiency is improved.

Figure 18A:
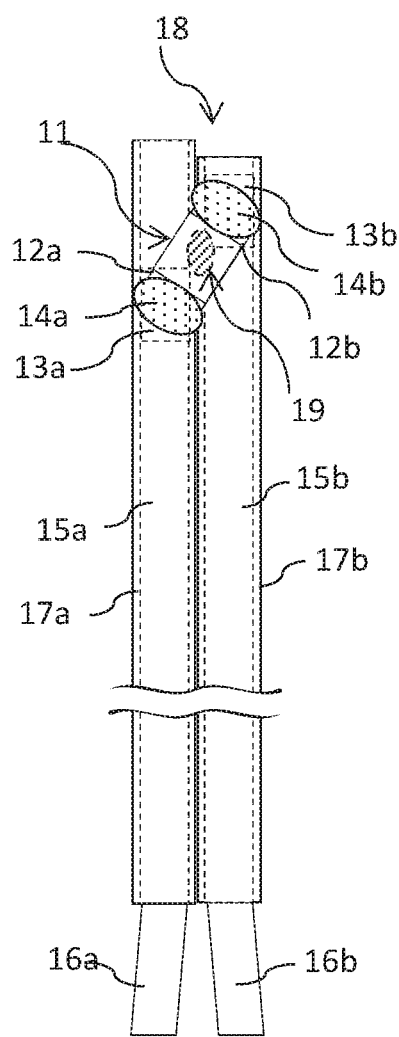
FIGS. 18A to 18C are a top view, a side view, and a front view, respectively, illustrating another example of a thermistor module with leads according to the sixth preferred embodiment of the present invention.
Figure 18B:
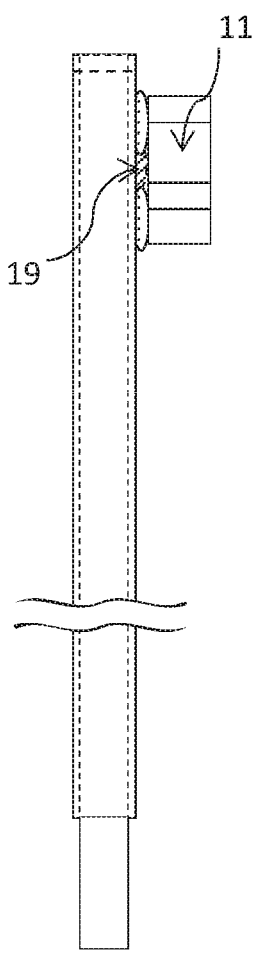
Figure 18C:
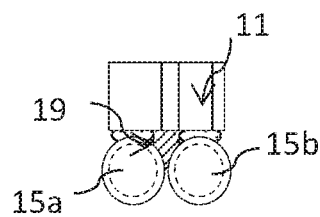

FIGS. 18A to 18C are a top view, a side view, and a front view, respectively, illustrating another example of an electronic component module with leads according to the sixth preferred embodiment. In the present example, the end surface of the first lead 15a to mount one end of the electronic component 11 and the end surface of the second lead 15b to mount one end of the electronic component 11 form a segment difference, that is, the end surface of the first lead 15a to mount one end of the electronic component 11 is more protruded than the end surface of the second lead 15b to mount one end of the electronic component 11. It also can be the that, the first lead 15a extends longer in the length direction with respect to the second lead 15b, so that the edge of the end surface of the first lead 15a and the edge of the end surface of the second lead 15b are not adjacent and cannot come into contact with each other.

Between metal wire exposed portions 13a and 13b, an insulating material 19 having an adhesive property, such as an epoxy resin, is coated. Specifically, the insulating material 19 is coated between metal wire exposed portions 13a and 13b and is located at adjacent area of the first lead 15a and the second lead 15b.

Moreover, FIG. 20 illustrates an example of a configuration of an electronic component module with leads according to the present preferred embodiment. As shown in FIG. 20, the electronic component module may further include an insulating resin 50 which packages the electronic components, as well as a front end of the first and second leads on which the electronic component is mounted. By using the insulating resin 50 to package, the environmental adaptability of the electronic component module is improved.

Seventh Preferred Embodiment

Next, an electronic component module with leads according to the seventh preferred embodiment will be described. According to the seventh preferred embodiment, the electronic component may be a chip electronic component including an electrode at both ends, such as a chip resistor, a chip capacitor, a chip inductor, a piezoelectric element, and a thermistor, etc.

In the seventh preferred embodiment, a plurality of electronic components are mounted on the first and second leads at a predetermined interval so that the electronic components of electronic component module with leads are connected in parallel for various different applications.

For example, when a thermistor is used as an electronic component, set the most likely hot spot of the battery cell of the mobile phone as a measurement point, and arrange the temperature sensing portion of the thermistor, so that it is possible to accurately perform the battery charging and discharging control.

FIGS. 18A to 18C illustrate a configuration of an electronic component module with leads according to the seventh preferred embodiment of the present invention when applied to a fuel battery temperature detection.

In the fuel battery, the battery case 35 is provided with three battery cells 32a, 32b, and 32c inside, and a control board 37 is disposed at the end of the battery case 35.

Since the lead is mounted on the control board 37, the measurement point must be separated from the control board 37 when it is desired to measure the temperature of the battery cell 32b.

In this case, by soldering a single thermistor to the first and second leads, it is possible to detect the temperature of the battery cell 32b.

When it is desired to measure the temperature of all the three battery cells 32a to 32c, as shown in FIG. 20, on the first and second leads 34a and 34b, set a predetermined distance as needed, and then mount thermistors 31a, 31b, 31c as electronic components connected in parallel. It is possible to perform a more accurate temperature measurement of the three battery cells 32a to 32c.

In addition to temperature detection of fuel battery, the temperature sensing portion of the thermistor can be also arranged at the heat generating portion of a FET (Field Effect Transistor) used for power supply, so that it can be quickly and accurately controlled when the FET generates abnormal heat.

Figure 19:
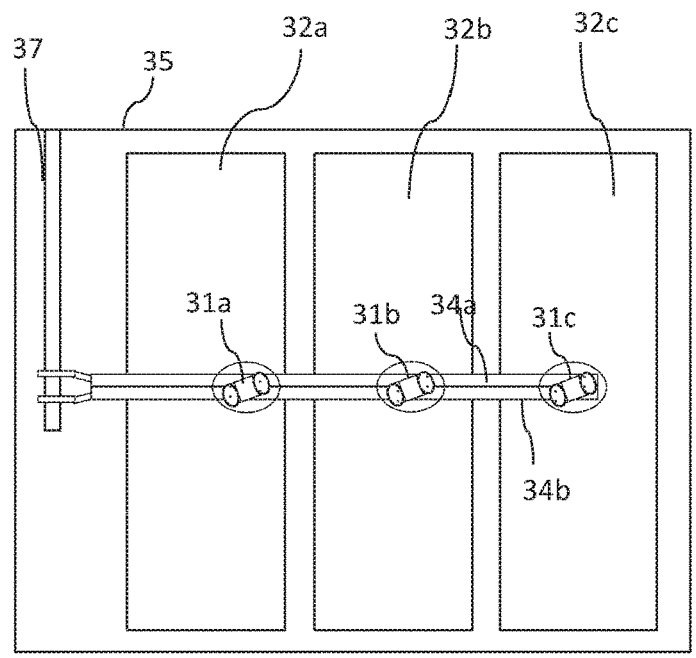
FIG. 19 illustrates a configuration of an electronic component module with leads according to a seventh preferred embodiment of the present invention when applied to a fuel battery temperature detection.

In addition, a plurality of FETs and a large battery are mounted on an electronic device such as a personal computer, by using a plurality of thermistors connected as shown in FIG. 19, the temperature measurement is able to be performed efficiently.

In addition to using a thermistor as an electronic component for temperature measurement, a plurality of other electronic components which can be used as a sensing device and other devices can be connected in parallel or substantially parallel to provide an electronic component module with leads of the seventh preferred embodiment, to obtain a corresponding function.

In addition, the electronic component module of the present preferred embodiment may further include an insulating resin which packages electronic components, as well as the portion of the first and second leads on which electronic components are mounted. By using the insulating resin (not shown) to package, the environmental adaptability of the electronic component module is improved.

In addition, in various preferred embodiments of the present invention, the electronic component is preferably a thermistor, and a lead can be welded and fixed to a control board such as a printed circuit board, the thermistor mounted on the lead can be extended with the lead and placed in a target location where temperature sensing is required or heat changes may occur. The present invention is not limited to the above-described preferred embodiments, and various modifications may be made within the scope of the claims, and the preferred embodiments obtained by appropriately combining the technical features and elements disclosed in the different preferred embodiments are also included in the technical scope of the present invention. For example, in the present invention, a non-laminated thermistor without internal electrode may be used, or an electronic component other than a thermistor may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component module with leads, comprising:
    an electronic component including a body and terminal electrodes at both ends of the body; and
    first and second leads including metal wires covered with insulating members and arranged side-by-side; wherein
    the first and second leads are electrically connected to the terminal electrodes, respectively;
    metal wire exposed portions where the metal wires are exposed respectively from the first and second leads are provided on joint surfaces of the first and second leads on a same side used to join to the terminal electrodes, and the metal wire exposed portion of the first lead and the metal wire exposed portion of the second lead are spaced apart from each other by a predetermined interval in a lead length direction;
    the terminal electrodes are electrically connected to the metal wire exposed portions of the first and second leads, respectively, by solder;
    the insulating member of the first lead extends between the metal wire exposed portion of the first lead and an end portion of the first lead adjacent to the metal wire exposed portion of the first lead; and
    the insulating member of the second lead extends between the metal wire exposed portion of the second lead and an end portion of the second lead adjacent to the metal wire exposed portion of the second lead.

2. The electronic component module with leads according to claim 1, wherein the electronic component is provided with a predetermined angle between a length direction of the electronic component and the lead length direction.

3. The electronic component module with leads according to claim 1, wherein the electronic component is structured that a length direction of the electronic component is parallel or substantially parallel to the lead length direction.

4. The electronic component module with leads according to claim 1, wherein an area of the exposed metal wire portions of the first and second leads is equal to or greater than a joining area of the terminal electrodes and the corresponding exposed metal wire portions, respectively.

5. The electronic component module with leads according to claim 1, wherein the exposed metal wire portions of the first and second leads respectively extends to an outer peripheral side of the corresponding the leads, toward non-adjacent outer directions of the first and second leads.

6. The electronic component module with leads according to claim 1, wherein an end surface of the first lead to mount one end of the electronic component and an end surface of the second lead to mount one end of the electronic component are not aligned with each other and are not continuous.

7. The electronic component module with leads according to claim 6, wherein the end surface of the first lead to mount one end of the electronic component is protruded as compared with the end surface of the second lead to mount one end of the electronic component.

8. The electronic component module with leads according to claim 1, wherein an insulating material is provided between the metal wire exposed portions.

9. The electronic component module with leads according to claim 8, wherein the insulating material covers a portion of the metal wire exposed portions.

10. The electronic component module with leads according to claim 8, wherein the insulating material does not cover the metal wire exposed portions.

11. The electronic component module with leads according to claim 8, wherein the insulating material extends to a side wall of the electronic component between two of the terminal electrodes.

12. The electronic component module with leads according to claim 8, wherein the first and second leads and the electronic component are fixed to each other by the insulating material.

13. The electronic component module with leads according to claim 1, wherein a plurality of the electronic components are mounted on the first lead and the second lead at a predetermined interval.

14. The electronic component module with leads according to claim 1, wherein the electronic component is a thermistor.

15. The electronic component module with leads according to claim 14, wherein the thermistor is a surface-mount thermistor.

16. The electronic component module with leads according to claim 15, wherein the surface-mount thermistor includes an internal electrode.

17. A method of manufacturing an electronic component module with leads, for mounting an electronic component including terminal electrodes at both ends of the electronic component body onto first and second leads which are formed by covering metal wires with insulating members and arranged side-by-side, the method comprising:
    forming metal wire exposed portions where metal wires are exposed respectively from the first and second leads on joint surfaces of the first and second leads on a same side and for joining to the terminal electrodes, and spacing the metal wire exposed portion of the first lead and the metal wire exposed portion of the second lead apart from each other by a predetermined interval in a lead length direction;
    applying solder to the metal wire exposed portions of the first and second leads, respectively; and
    bringing the terminal electrodes into contact with the solder of the metal wire exposed portions of the first and second leads, respectively, and heating the solder to melt so that the terminal electrodes are respectively joined to the metal wire exposed portions of the first and second leads; wherein
    the insulating member of the first lead extends between the metal wire exposed portion of the first lead and an end portion of the first lead adjacent to the metal wire exposed portion of the first lead; and
    the insulating member of the second lead extends between the metal wire exposed portion of the second lead and an end portion of the second lead adjacent to the metal wire exposed portion of the second lead.

18. The method of manufacturing an electronic component module with leads according to claim 17, wherein the electronic component is provided with a predetermined angle between a length direction of the electronic component and the lead length direction.

19. The method of manufacturing an electronic component module with leads according to claim 17, wherein the electronic component is formed such that a length direction of the electronic component is parallel or substantially parallel to the lead length direction.

20. The method of manufacturing an electronic component module with leads according to claim 17, further comprising a step of applying an insulating material between the metal wire exposed portions of the first and second leads.

21. The method of manufacturing an electronic component module with leads according to claim 20, wherein when the insulating material is applied between the metal wire exposed portions, the insulating material also covers a portion of the metal wire exposed portions.

22. A method of manufacturing an electronic component module with leads, for mounting an electronic component including terminal electrodes at both ends of the electronic component body onto first and second leads which are formed by covering metal wires with insulating members and arranged side-by-side, the method comprising:
- applying an insulating material to joint surfaces of the first and second leads on a same side and used to join to the terminal electrodes and a periphery thereof;
- removing the insulating members and the insulating material for forming metal wire exposed portions where the metal wires are exposed respectively from the first and second leads;
- separating the metal wire exposed portion of the first lead and the metal wire exposed portion of the second lead from each other by a predetermined interval in a lead length direction;
- applying solder to the metal wire exposed portions of the first and second leads, respectively; and
- bringing the terminal electrodes into contact with the solder of the metal wire exposed portions of the first and second leads, respectively, and heating the solder to melt so that the terminal electrodes are respectively joined to the metal wire exposed portions of the first and second leads.

\* \* \* \* \*